(12) United States Patent
Takahashi

(10) Patent No.: US 11,317,207 B2
(45) Date of Patent: Apr. 26, 2022

(54) MANAGEMENT SERVER, AUDIO MANAGEMENT METHOD, AUDIO CLIENT SYSTEM, AND AUDIO MANAGEMENT SYSTEM

(71) Applicant: Yamaha Corporation, Hamamatsu (JP)

(72) Inventor: Daisuke Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/162,764

(22) Filed: Jan. 29, 2021

(65) Prior Publication Data

US 2021/0243527 A1 Aug. 5, 2021

(30) Foreign Application Priority Data

Jan. 31, 2020 (JP) .............................. JP2020-015329

(51) Int. Cl.
H04R 29/00 (2006.01)
H04R 3/12 (2006.01)
G06F 16/23 (2019.01)
H04R 1/40 (2006.01)
H04R 27/00 (2006.01)

(52) U.S. Cl.
CPC ............ *H04R 3/12* (2013.01); *G06F 16/2379* (2019.01); *H04R 1/403* (2013.01); *H04R 27/00* (2013.01); *H04R 29/002* (2013.01); *H04R 2227/003* (2013.01)

(58) Field of Classification Search
CPC .... H04R 29/00; H04R 29/001; H04R 29/002; H04R 3/12; H04R 1/403; H04R 27/00; H04R 2227/003; H04R 2227/005
USPC .................... 381/58–59, 55, 77–85, 111, 117
See application file for complete search history.

(56) References Cited

U.S. PATENT DOCUMENTS 9,838,813 B2 * 12/2017 Kuells .................. H04R 29/007
2015/0365774 A1 * 12/2015 Kuells .................. H04R 29/007
381/59
2019/0028805 A1 * 1/2019 Goto ..................... H04R 3/007
2020/0348902 A1 11/2020 Park et al.

FOREIGN PATENT DOCUMENTS

JP 2011-223515 A 11/2011
WO WO 2019/112357 A1 6/2019

OTHER PUBLICATIONS

Extended European Search Report issued in European Application No. 21153721.2 dated Jun. 14, 2021 (eight (8) pages).

* cited by examiner

*Primary Examiner* — Disler Paul
(74) *Attorney, Agent, or Firm* — Crowell & Moring LLP

(57) ABSTRACT

A management server controls, by use of a first database, a first audio client system that includes a first speaker and a second speaker. The first database includes a first standard characteristic impedance, which is obtained by application of statistical processing to a first characteristic impedance of the first speaker and a second characteristic impedance of the second speaker. The management server acquires a new characteristic impedance of the first speaker, compares the new first characteristic impedance with the first standard characteristic impedance, to determine a condition of the first speaker, based on a result of the comparison. The management server updates, based on the condition of the first speaker, the first standard characteristic impedance of the first database, using the new first characteristic impedance.

11 Claims, 9 Drawing Sheets

MANAGEMENT SERVER, AUDIO MANAGEMENT METHOD, AUDIO CLIENT SYSTEM, AND AUDIO MANAGEMENT SYSTEM

CROSS REFERENCE TO RELATED APPLICATION

This application claims priority from Japanese Patent Application No. 2020-015329, filed Jan. 31, 2020, the entire contents of which are incorporated herein by reference.

BACKGROUND

Field of the Invention

The present disclosure relates to management servers, audio management methods, audio client systems, and audio management systems.

Description of Related Art

An audio system that includes speakers and amplifiers is placed in a building (e.g., a music venue, a theater, or a hall), or is placed outdoors. For such an audio system, it is important to test the audio system under various conditions. In one technique, more than one amplifier is provided and each amplifier is connected to respective speakers. The speakers are sequentially selected in response to sequence information to output sound.

Use of the above technique is subject to a drawback in that a person is able to assess whether the speakers are working properly unless he/she listens to sound output from the speakers, which requires both time and effort.

SUMMARY

In consideration of such circumstances, an object of the present disclosure is to provide techniques for saving the labor required for management of audio systems for an administrator.

To achieve the above object, a management server of an aspect according to the present disclosure is a management server including: a memory; and at least one processor configured to implement instructions stored in the memory, in which: the at least one processor is configured to: control, by use of a first database, a first audio client system that includes a first speaker and a second speaker, the first database including a first standard characteristic impedance, which is obtained by application of statistical processing to a first characteristic impedance of the first speaker and a second characteristic impedance of the second speaker, acquire a new characteristic impedance of the first speaker; compare the new first characteristic impedance with the first standard characteristic impedance, to determine a condition of the first speaker, based on a result of the comparison, and update, based on the condition of the first speaker, the first standard characteristic impedance of the first database, using the new first characteristic impedance.

An audio management method according to an aspect of this disclosure is an audio management method implemented by a processor, including: preparing a first audio client system that includes a first speaker and a second speaker; preparing a first database that includes a first standard characteristic impedance, which is obtained by application of statistical processing to a first characteristic impedance of the first speaker and a second characteristic impedance of the second speaker; acquiring a new characteristic impedance of the first speaker; comparing the new first characteristic impedance with the first standard characteristic impedance; determining a condition of the first speaker, based on a result of the comparison; and updating, based on the condition of the first speaker, the first standard characteristic impedance of the first database, using the new first characteristic impedance.

An audio client system according to an aspect of this disclosure is an audio client system including a first speaker; a second speaker; a communication apparatus configured to communicate with a management server that uses a first database; the first database including a first standard characteristic impedance, which is obtained by application of statistical processing to a first characteristic impedance of the first speaker and a second characteristic impedance of the second speaker, a measuring instrument configured to measure a new first characteristic impedance of the first speaker; a memory; and at least one processor configured to implement instructions stored in the memory, in which: the at least one processor is configured to cause the communication apparatus to transmit the new first characteristic impedance to the management server, and a condition of the first speaker is determined by the management server, based on the new first characteristic impedance and the first standard characteristic impedance.

An audio management system according to an aspect of this disclosure is An audio management system including: a management server; a first audio client system that includes a first speaker and a second speaker; and a first database that includes a first standard characteristic impedance, which is obtained by application of statistical processing to a first characteristic impedance of the first speaker and a second characteristic impedance of the second speaker, in which: the first audio client system further includes: a communication apparatus configured to communicate with the management server; a measuring instrument configured to measure a new first characteristic impedance of the first speaker; a first memory; and at least one first processor configured to implement instructions stored in the first memory, the at least one first processor is configured to cause the communication apparatus to transmit the new first characteristic impedance to the management server, the management server includes: a second memory; and at least one second processor configured to implement instructions stored in the second memory, the at least one second processor is configured to: acquire, from the first audio client system, the new characteristic impedance of the first speaker, compare the new first characteristic impedance with the first standard characteristic impedance, to determine a condition of the first speaker, based on a result of the comparison, and update, based on the condition of the first speaker, the first standard characteristic impedance of the first database, using the new first characteristic impedance. Other objects, advantages and novel features of the present disclosure will become apparent from the following detailed description of one or more preferred embodiments when considered in conjunction with the accompanying drawings, in which:

DETAILED DESCRIPTION

Figure 1:
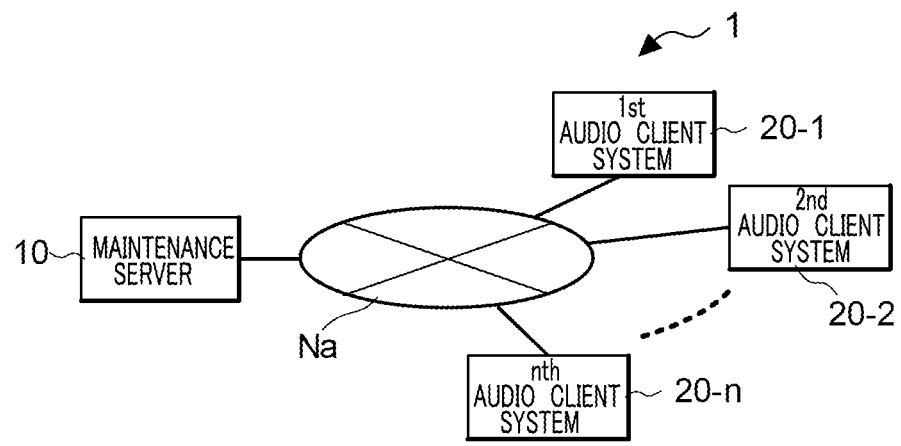
FIG. 1 is a diagram illustrating a configuration of an audio management system.

FIG. 1 is a diagram illustrating the configuration of an audio management system 1. The audio management system 1 includes a management server 10, a first audio client system 20-1, a second audio client system 20-2, and so on to an nth audio client system 20-n. Each of the audio client systems is connected to the management server 10 via a communication network Na. In the example shown in FIG. 1, for convenience of explanation, "n" is an integer that is greater than 3. The communication network Na is typically the Internet, but may be another network, either wired or wireless. The communication network Na is a network suffices to enable the management server 10 to communicate with the first audio client system 20-1 to the nth audio client system 20-n in remote locations.

In the following description, the term "connection" refers to a state in which two or more components are directly coupled to each other, and also to a state in which one or more intermediate components are present therebetween. A connection between components may be a physical connection (e.g., a wired connection using cable). Furthermore, in this description, the term "audio client system(s) 20" will be used so long as the first audio client system 20-1 to the nth audio client system 20-n are not distinguished from each other. Each of the audio client systems 20 includes multiple speakers. The management server 10 manages these speakers. The management server 10 outputs various instructions to the audio client systems 20 and receives various information from the audio client systems 20. The audio management system 1 enables speakers to be identified that are not working properly from among the speakers provided in the audio client systems 20-1 to 20-n, during normal use of the audio client systems. In particular, the audio management system 1 enables early identification of speakers that although apparently outputting sound normally, are nonetheless liable to malfunction due to deterioration over time.

Figure 2:
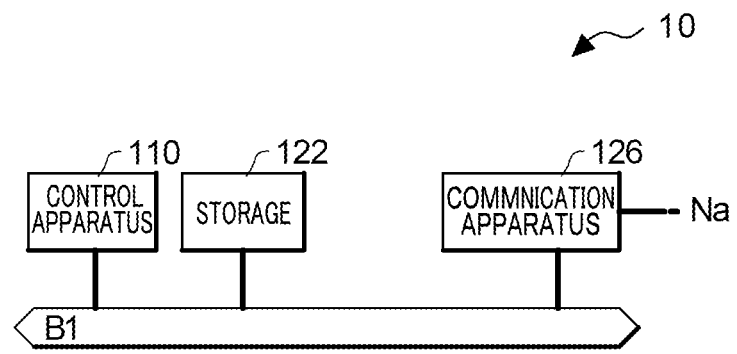
FIG. 2 is a diagram illustrating a hardware configuration of a management server in the audio management system.

FIG. 2 is a diagram illustrating a hardware configuration of the management server 10. The management server 10 is an information processing terminal, such as a personal computer. The management server 10 includes a control apparatus 110, a storage 122, and a communication apparatus 126. These components are interconnected through a bus B1. The control apparatus 110 includes one or more processing circuits, such as a central processing unit (CPU), and controls each component in the management server 10.

The storage 122 is configured by use of one or multiple memories, each of which may be a known recording medium, such as a magnetic recording medium or a semiconductor recording medium. The storage 122 stores thereon a program for execution by the control apparatus 110, and various data used by the program. The storage 122 may include a combination of several types of recording media. Furthermore, the storage 122 may be a portable recording medium that is removable from the management server 10, or may be an external recording medium (e.g., an online storage) that communicates with the management server 10 over the communication network Na. The communication apparatus 126 communicates with the audio client systems 20 and other similar apparatuses (external recording mediums) over the communication network Na.

Figure 3:
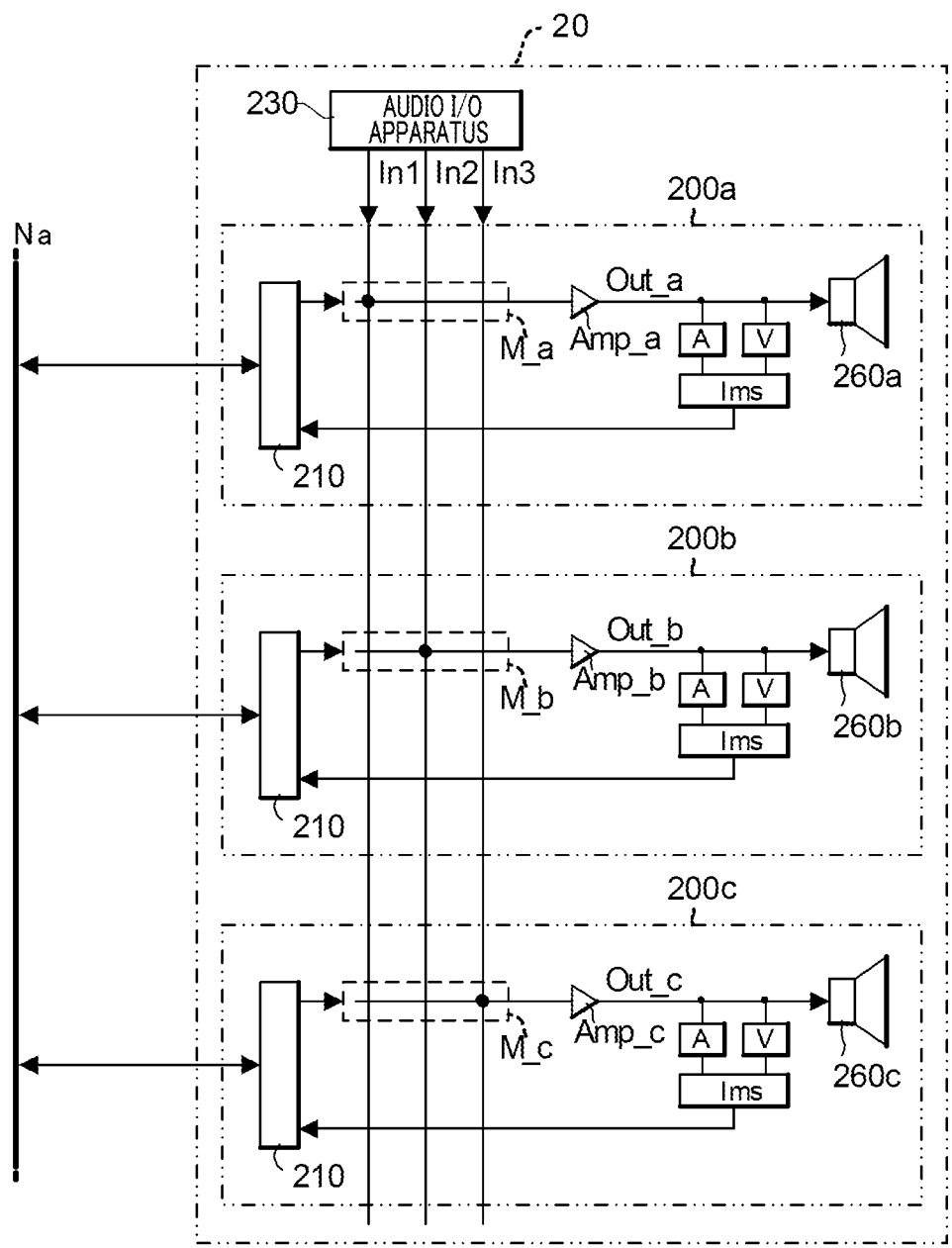
FIG. 3 is a diagram illustrating a hardware configuration of an audio client system in the audio management system.

FIG. 3 is a diagram that illustrates a hardware configuration of the audio client system 20. In this embodiment, the audio client system 20 includes audio systems 200a, 200b, and 200c. The audio systems 200a, 200b, and 200c are placed in a hall (e.g., a music venue and a theater), or are placed outdoors. In this embodiment, the number of audio systems included in a single audio client system 20 is not limited to that shown in the example of FIG. 3. It is sufficient for at least one audio system 20 to be included in a single audio client system 20. In this embodiment, the audio client system includes the audio systems 200a, 200b, and 200c, and the audio client system 20 in its entirety can be thought of as a single audio system.

The audio client system 20 includes an audio input/output (audio I/O) apparatus 230 in addition to the audio systems 200a, 200b, and 200c. In the example shown in FIG. 3, the audio I/O apparatus 230 receives three kinds of audio signals, and outputs the audio signals with a one-to-one correspondence to channels In1, In2, and In3. Alternatively, the audio I/O apparatus 230 may output one received audio signal to multi channels. The audio signals input into the audio I/O apparatus 230 may be analog or digital. Examples of the audio signals include a pickup signal from a microphone, an output signal from a musical instrument, and an audio signal from a movie.

The audio system 200a will now be described. The audio system 200a includes a speaker 260a. The audio system 200a makes an appropriate selection of one or more channels as necessary from among the channels In1, In2, and In3, and outputs signals of the selected channels to the speaker 260a. Specifically, the audio system 200a further includes a processing apparatus 210, a matrix selector M_a, an amplifier Amp_a, a current sensor A, a voltage sensor V, and a measuring instrument Ims. The processing apparatus 210 is an information processing terminal, such as a personal computer. The processing apparatus 210 is connected to the management server 10 over the communication network Na. The processing apparatus 210 controls the selection to be made by the matrix selector M_a, and receives a characteristic impedance of the speaker 260a from the measuring instrument Tins. The matrix selector M_a selects one or more required channels from among the channels In1, In2, and In3 under manual operation by the user or instructions from the processing apparatus 210. The matrix selector M_a mixes the audio signals of the selected channels with each other, and supplies the mixed signals to the amplifier Amp_a. It is of note that FIG. 3 shows an example in which the channel In_1 is selected by the matrix selector M_a. A dot shown in a block of the matrix selector M_a represents a connection of a signal line of the channel In_1 with a signal line connected to the amplifier Amp_a.

In the audio system 200a, the amplifier Amp_a amplifies the output signal from the matrix selector M_a, and supplies, as an audio signal Out_a, the amplified signal to the speaker 260a. In the audio system 200a, the current sensor A detects the current of the audio signal Out_a. The voltage sensor V detects the voltage of the audio signal Out_a. The measuring instrument Ims measures the characteristic impedance of the speaker 260a based on the current detected by the current sensor A and the voltage detected by the voltage sensor V.

Figure 9:
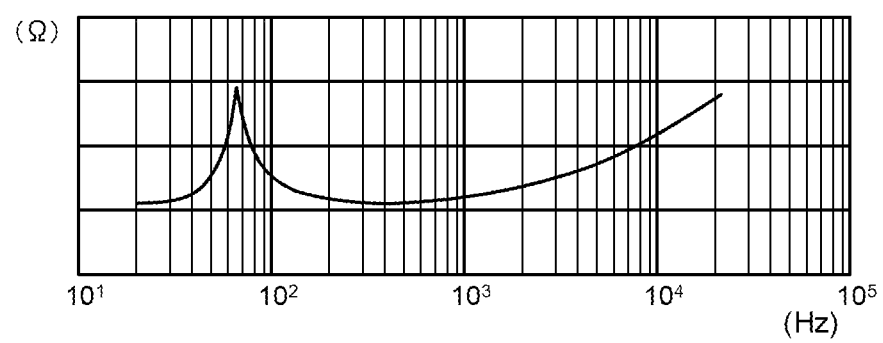
FIG. 9 is a diagram illustrating an example of the characteristic impedance of a speaker in an audio client system.

In this embodiment, a characteristic impedance of the speaker 260a is compared to a standard impedance, referred to herein as "the standard characteristic impedance," to determine whether the speaker 260a is working properly based on the result of comparison. Here, the method of measuring a characteristic impedance of the speaker 260a will be briefly described. The characteristic impedance herein refers to the relationship between the impedance (Q) and the frequency (Hz) when an audio signal is supplied to the speaker 260a. Specifically, a characteristic impedance refers to the characteristics as plotted on the graph shown in FIG. 9. The vertical axis represents the impedance of the speaker 260a, and the horizontal axis represents the frequency. The standard characteristic impedance will be described later.

The characteristic impedance of the speaker 260a is measured by the measuring instrument Ims as follows.

Specifically, the measuring instrument Ims has an internal memory (not illustrated). First, the measuring instrument Ims applies a fast Fourier transform to the current detected by the current sensor A to obtain a frequency spectrum of the current, which is defined by current level and frequency component. Similarly the measuring instrument Ims applies a fast Fourier transform to the voltage detected by the voltage sensor V to obtain a frequency spectrum, which is defined by voltage level and frequency component.

Second, the measuring instrument Ims divides a voltage level by a current level for each frequency component, thereby obtaining an impedance for each frequency component. Then the measuring instrument Ims generates one-to-one mapping of impedances with frequency components, thereby obtaining a characteristic impedance of the speaker 260a. This characteristic impedance is written on top of the old one in the internal memory.

The frequency range of the characteristic impedance may be the audible frequency (ranging from 20 Hz to 20 kHz), but is not limited to this range. It is of note that if the current level and the voltage level obtained by the fast Fourier transforms may be relatively small (e.g., each level is less than a threshold), error influence may increase. In such a case, the latest characteristic impedance is not required to be written in the internal memory.

These steps are carried out, while the audio signal Out is supplied to the speaker 260a, that is, while the speaker 260a is outputting sound. At this time, the old characteristic impedance is updated to the latest one. Resulting from these steps, an example of a characteristic impedance is obtained shown in FIG. 9.

The speaker 260a converts the audio signal Out_a output from the amplifier Amp_a into sound.

Each of the configurations of the audio systems 200b and 200c is substantially the same as the audio system 200a. In the example shown in FIG. 3, a matrix selector M_b provided in the audio system 200b selects the channel In2, and a matrix selector M_c provided in the audio system 200c selects the channel In3. In the example shown in FIG. 3, an audio signal output from an amplifier Amp_b is denoted as Out_b, and an audio signal output from an amplifier Amp_c is denoted as Out_c. Description of the other configurations thereof will be omitted.

Hereinafter, the term "speaker(s) 260" will be used in so far as the speakers 260a, 260b and 260c are not distinguished from each other. Similarly, the term "audio system(s)" will be used in so far as the audio systems 200a, 200b and 200c are not distinguished from each other.

Each of the audio systems 200 shown in FIG. 3 may be configured as follows. In a case of digital processing, each of the audio systems 200 may output an analog audio signal converted by D/A convertor to the corresponding speaker 260.

Furthermore, each of the audio systems 200 may be provided with a mixer that allocates mixed audio signals to the channel In1, In2, and In3. In addition, each of the audio systems 200 may be provided with an audio processor that processes audio signals supplied to the channels In1, In2, and In3. The number of speakers included in the single audio client system 20 may or may not be the same as that of another audio client system 20.

Figure 4:
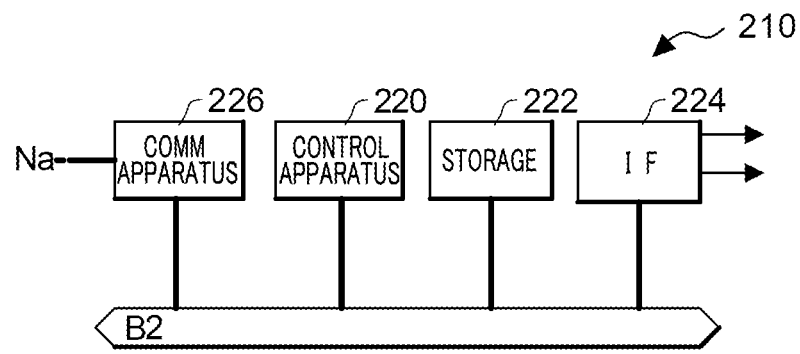
FIG. 4 is a diagram illustrating a hardware configuration of a processing apparatus in an audio client system.

FIG. 4 is a diagram illustrating a hardware configuration of the processing apparatus 210 in the audio client system 20. The processing apparatus 210 includes a control apparatus 220, a storage 222, an interface (IF) 224, and a communication apparatus 226. These components are interconnected through a bus B2. The control apparatus 220 includes one or multiple processing circuits, such as a CPU, and controls each component provided in the processing apparatus 210. The storage 222 is configured to have one or multiple memories using a known recording medium. The storage 222 stores thereon a program executed by the control apparatus 2100 and various data used by the control apparatus 2100. The interface 224 carries out input and output of information between the matrix selector M_a and the measuring instrument Ims in the audio system 200. The communication apparatus 226 communicates with the management server 10 over the communication network Na.

Figure 5:
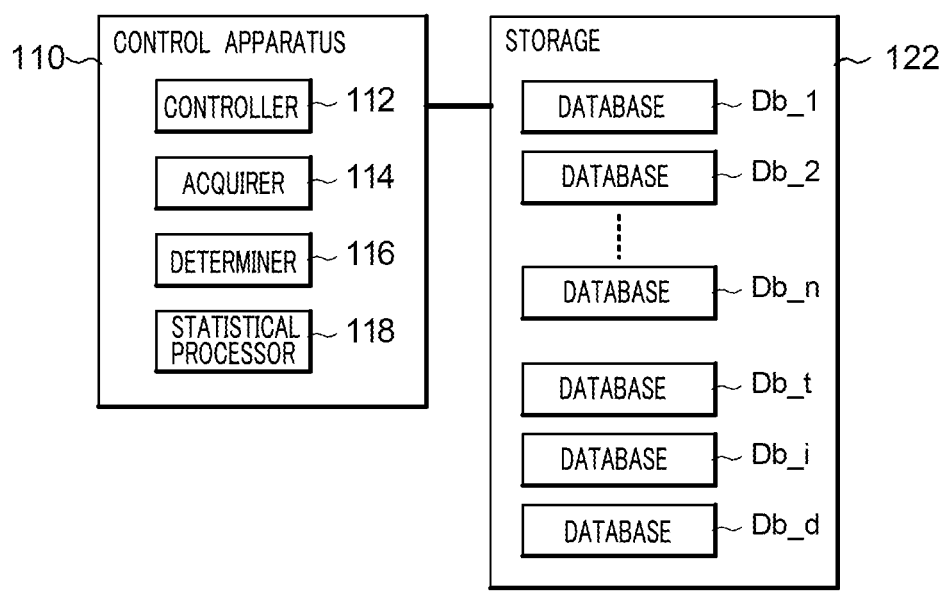
FIG. 5 is a functional block diagram of the management server.

For convenience of explanation, processing carried out by the control apparatus 110 of the management server 10 will be described using functional blocks. FIG. 5 is a diagram illustrating functional blocks generated by the control apparatus 110 and the storage 122. A program stored in the storage 122 is executed by the control apparatus 110. As a result, in the control apparatus 110, a controller 112, an acquirer 114, a determiner 116, and a statistical processor 118 are generated as functional blocks. In the storage 122, databases Db_1, Db_2, ..., Db_n and databases Db_t, Db_i, and Db_d are generated as functional blocks.

The method of achieving each functional block is not particularly limited. Each functional block may also be achieved by hardware rather than by execution of software, or by a combination of both hardware and software.

Figure 6:
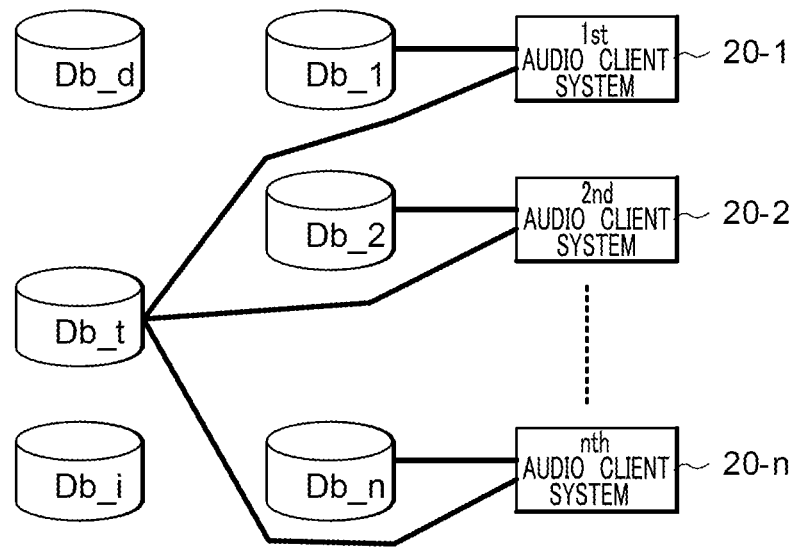
FIG. 6 is a diagram illustrating correspondence relationships between audio client systems and databases.

The functional blocks generated in the storage 122 will be described with reference to FIG. 6. FIG. 6 is a diagram illustrating correspondence relationships between the databases Db_t, Db_i, Db_d, Db_1, Db_2, ..., Db_n and multiple audio client systems 20. The database Db_t includes the standard characteristic impedance. The standard characteristic impedance refers to a standard that is used for determining conditions of all the speakers 260 included in the audio client systems 20-1 to 20-n.

The standard characteristic impedance is a reference characteristic impedance constituted of multiple averaged characteristic impedances. Averaging is an example of statistical processing. However, in this instance, the multiple characteristic impedances are obtained only from only speakers 260 that are determined to be normal, from among all the audio client systems 20-1 to 20-*n*. The standard characteristic impedance is obtained as follows. First, characteristic impedances of all the speakers 260 are registered in the database Db_t. Next, these characteristic impedances are averaged. The standard characteristic impedance is updated. The method of updating is as follows. First, when a new impedance is obtained from a speaker 260, this characteristic impedance is registered in the database Db_t. In other words, the new characteristic impedance is accumulated in the database Db_t. That is, the new characteristic impedance is added to accumulated impedances. Next, the accumulated impedances are averaged. In this manner, the standard impedance characteristic is updated.

As described above, characteristic impedances are defined by impedances for each frequency component. Accordingly, strictly speaking, a set of impedances for each frequency component is registered in the database rather than the characteristic impedances themselves. However, for convenience of explanation, the phrase "characteristic impedances are registered in the database" will be used.

The database Db_i includes ideal characteristic impedances of all the speakers 260 included in audio client systems 20-1 to 20-*n*. These ideal characteristic impedances are obtained by measuring the speakers 260 in an ideal state. The ideal state herein refers to the new state immediately after a speaker 260 is manufactured, or the state in which the speaker 260 delivers theoretical performance.

The database Db_d includes characteristic impedances of speakers 260 determined abnormal. Here, "abnormal" refers to a case in which sound is output from a speaker that differs from the normal output sound (sound output from the ideal speaker), or a case in which sound output from a speaker appears to be normal, but one or more component of the speaker has deteriorated or been damaged. However, the following cases are not included: a case in which a speaker is not turned on; and a case in which sound fails to be output from the speaker. In other words, it is assumed that sound is output.

The database Db_1 corresponds to the first audio client system 20-1. The database Db_1 includes the initial characteristic impedances of the speakers 260 included in the first audio client system 20-1. The initial characteristic impedances are registered by the first audio client system 20-1 (the processing apparatus 210). Each of the initial characteristic impedances refers to one that is measured for the first time when the audio management system 1 is introduced for the first time.

The database Db_2 corresponds to the second audio client system 20-2. The database Db_2 includes the initial characteristic impedances of the speakers 260 included in the second audio client system 20-2. The initial characteristic impedances are registered by the second audio client system 20-2 (the processing apparatus 210).

The database Db_n corresponds to the nth audio client system 20-*n*. The database Db_n, includes the initial characteristic impedances of the speakers 260 included in the nth audio client system 20-*n*. The initial characteristic impedances are registered by the n-th audio client system 20-*n* (the processing apparatus 210).

In this embodiment, to determine a condition of a speaker 260 to be checked, that is, to determine whether the speaker is normal, a characteristic impedance of the speaker 260 is compared to the standard characteristic impedance.

The reason for adopting this method is as follows. The focus of attention here is on one of the speakers 260 included in one of the multiple audio client systems 20. The initial characteristic impedance of this speaker 260 is registered in the database corresponding to the audio client system 20 from among the databases Db_1 to Db_n. It is assumed that this database is used, and that the following method is used to determine a condition of the speaker 260. Specifically, a characteristic impedance measured at a last time is compared to an initial characteristic impedance. As a result, if a divergence between the two is relatively large (that is, if a similarity is low), the speaker 260 may be determined abnormal. Although there are various causes of speaker failure, such as deterioration over time and physical component damage, this method of comparing the two characteristic impedances is not able to identify a cause of failure.

A cause of deterioration over time will be discussed below. Each of the speakers 260 includes a coil and a diaphragm. When a current flows through the coil, the diaphragm vibrates and as a result sound is produced. However, it is assumed that the speakers 260 are placed in a large building (e.g., a music performance venue, a theater, or a hall). Such a speaker further includes a damper for the diaphragm. Speakers 260 placed in a large building have a larger diaphragm as compared to a diaphragm of a speaker for home use. When a large diaphragm in a speaker vibrates a substantial force acts on the speaker's diaphragm. Accordingly, dampers provided for the speakers 260 will deteriorate over time at a faster rate than their domestic-use equivalents. As a result, characteristic impedances of the speakers 260 also change over time. Needless to state, each speaker 260 includes a variety of components other than the damper, each of which may deteriorate over time.

As described above, even if no physical damage is present in a speaker 260, in some cases, characteristic impedances may change over time. It is of note that even if the characteristic impedances do change over time, such change may not necessarily influence an output sound, and thus the speaker 260 may be determined to be normal.

To verify degradation over time, the following method is considered in which a characteristic impedance of a speaker 260 measured last is compared to a characteristic impedance thereof at a time previous to the last measurement. A probability of occurrence of deterioration over a short period of time is relatively low. If a divergence between the two is relatively small (that is, if the similarity is high), no deterioration over time yet have occurred. However, depending on speaker quality and type, deterioration over time may occur even within a relatively short period of time. Notwithstanding, in this method, the focus of attention, is on only one speaker 260, and changes in other of the speakers is not taken into consideration. As a result, the method tends to lack of accuracy in determining a state of the speaker.

Accordingly, in this embodiment, to determine a condition of a speaker 260 to be checked, conditions of the other speakers 260 are taken into account. Specifically, to determine whether the speaker 260 to be checked is normal, a characteristic impedance of the speaker 260 is compared to the standard characteristic impedance. Here, the standard characteristic impedance is obtained by application of statistical processing to accumulated characteristic impedances of speakers that have been determined normal, from among the speakers 260 included in the audio client systems 20-1 to 20-*n*.

The database Db_t corresponds to all of the audio client systems 20-1 to 20-*n*. The database Db_i is independent from all of the audio client systems 20-1 to 20-*n*. That is, contents of the database Db_i are not affected by change in the contents of other databases. The database Db_d only corresponds to one or more audio client systems 20 that include a speaker 260 determined abnormal, from among the audio client systems 20-1 to 20-n.

The management server 10 will now be described with reference to FIG. 5. The controller 112 controls the acquirer 114, the determiner 116, and the statistical processor 118. The controller 112 acts to control the audio client systems 20-1 to 20-n. The acquirer 114 acquires characteristic impedances of all the speakers 260 included in the audio client systems 20-1 to 20-n. Description of the determiner 116 will now be given with reference to a speaker 260 included in one of the multiple audio client systems 20. Upon receipt of a characteristic impedance of the speaker 260 from the audio client system 20, the determiner 116 compares the characteristic impedance with the standard characteristic impedance stored in the database Db_t. The determiner 116 determines whether the speaker 260 is abnormal based on the comparison result.

Figure 10:
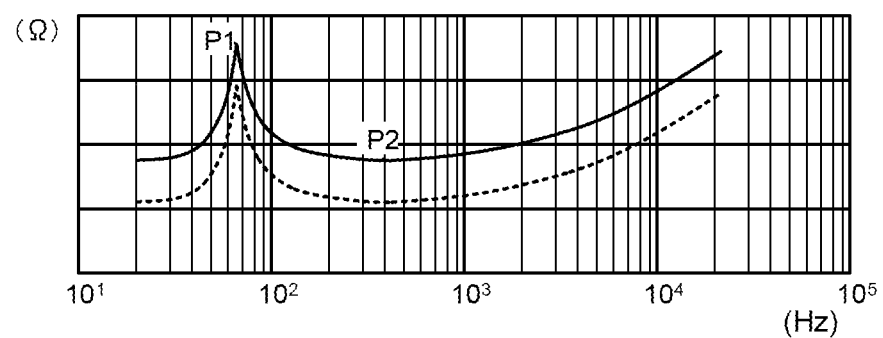
FIG. 10 is a diagram illustrating an example of the characteristic impedance of a speaker in an audio client system.

In FIG. 10, the solid line represents a characteristic impedance and the dashed line represents the standard characteristic impedance. The determiner 116 calculates, based on the two characteristic impedances, numerical values indicative of a divergence between the two for each frequency component (e.g., ranging from 20 Hz to 20 kHz). Then the determiner 116 determines whether the speaker 260 is abnormal based on the calculated numerical values. Specifically, if each of the numerical values is less than a threshold, the determiner 116 determines that the speaker 260 is normal, since the difference between the two characteristic impedances is relatively small.

In contrast, if each of the numerical values indicative of the divergence is at the threshold or greater, it is assumed that the acquired characteristic impedance does not satisfy the standard characteristic impedance, and therefore the determiner 116 determines that the speaker 260 is abnormal.

The determiner 116 repeats the above-mentioned determination for all the speakers 260 in the audio client system 20. Then the determiner 116 notifies the audio client system 20 which speaker 260 is abnormal from among all of the speakers 260 in the audio client system 20.

The determiner 116 may carry out the following determination methods (i) or (ii). (i) The determiner 116 may specify particular frequencies (e.g., 100 Hz, 1 kHz and 10 kHz), and may calculate, for each frequency, a difference in impedance between a characteristic impedance and the standard characteristic impedance, to thereby obtain for each frequency, a cumulative value of the difference. Alternatively, (ii) the determiner 116 may specify two peak points (the maximum P1 and the minimum P2) of a characteristic impedance, and may calculate a difference in frequency between two frequencies corresponding to the respective two peak points, to thereby obtain a cumulative value of the difference. In addition, the determiner 116 may calculate, for each of the two frequencies, a difference in impedance between the characteristic impedance and the standard characteristic impedance, to thereby obtain for each frequency, a cumulative value of the difference. The greater the cumulative difference values are the greater the divergence between the characteristic impedance and the standard characteristic impedance is.

The statistical processor 118 uses a characteristic impedance of a speaker 260 that is determined to be normal by the determiner 116, to update the standard characteristic impedance registered in the database Db_t. The details thereof are as follows. For the sake of simplicity, a case is assumed in which the averaged impedance characteristic is registered in the database Db_t in advance. The statistical processor 118 adds the impedance characteristic to the impedance characteristics of the database Db_t. The statistical processor 118 then applies the statistical processing to the impedance characteristics registered in the database Db_t, and thus the standard impedance characteristic is updated.

Next, the functional blocks generated in a processing apparatus 210 included in an audio system 200 will be described.

Figure 7:
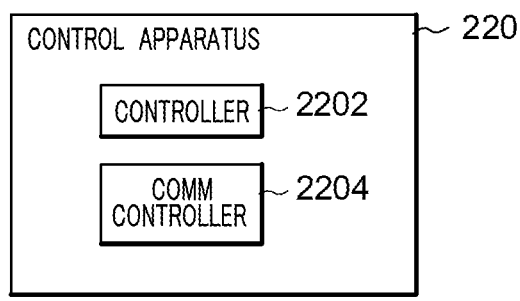
FIG. 7 is a functional block diagram of the processing apparatus.

FIG. 7 is a diagram illustrating functional blocks generated by the control apparatus 220 of an audio system 200. A program stored in the storage 222 is executed by the control apparatus 220. As a result, a controller 2202 and a communication controller 2204 are generated in the control apparatus 220. The controller 2202 controls the communication controller 2204.

The communication controller 2204 causes the communication apparatus 226 to transmit information to the management server 10 and to receive information from the management server 10. In this embodiment, examples of the information transmitted to the management server 10 include characteristic impedances of the speakers 260a, 260b, and 260c. Examples of the information received from the management server 10 include identifiers of speakers determined abnormal.

The controller 2202 receives an identifier (information including the identifier) of a speaker 260 determined abnormal. In this case, the controller 2202 stops the output of the speaker 260 indicated by the identifier so that sound ceases to be output from the speaker 260. In addition, the controller 2202 instructs audio systems 200, each of which includes a normal speaker, to complement the abnormal speaker 260.

Figure 8:
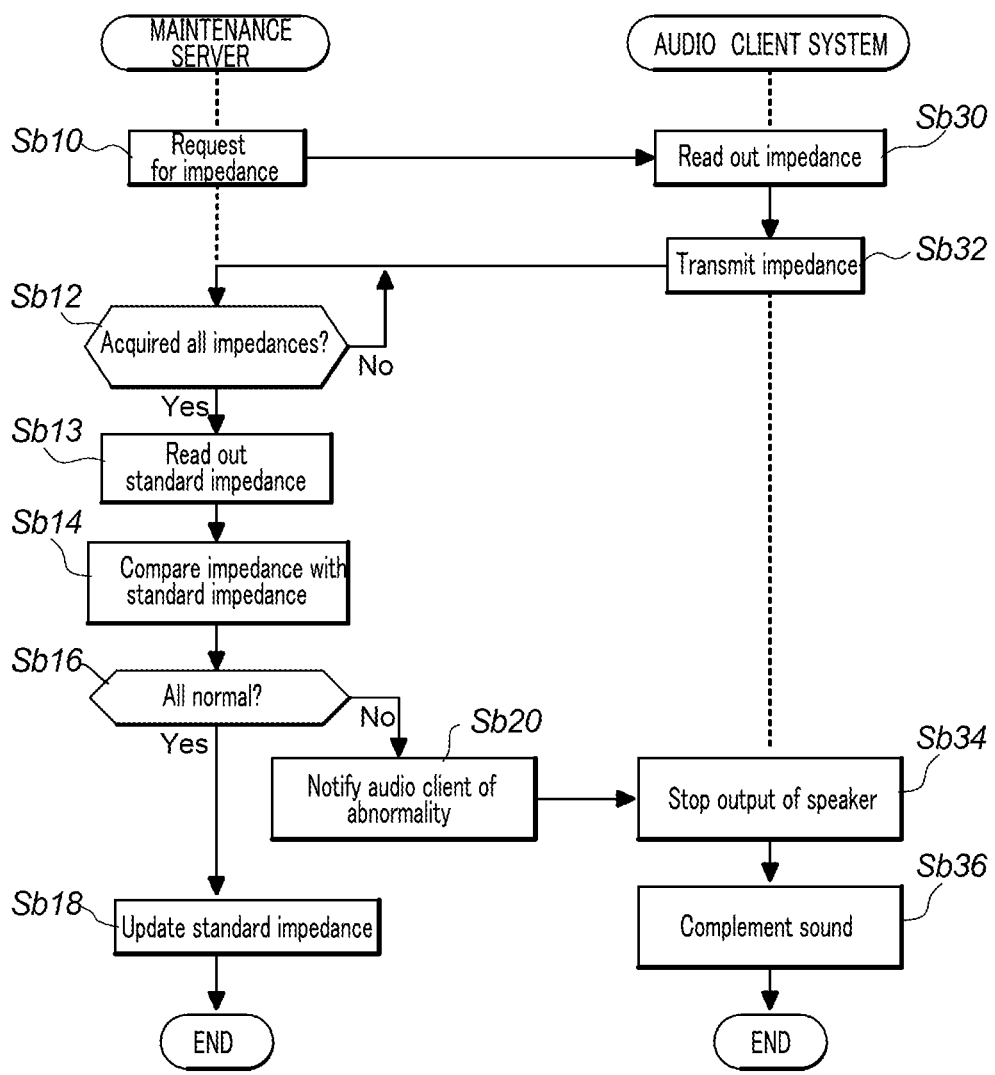
FIG. 8 is a flowchart illustrating operations carried out by the audio management system.

Next, operations carried out by the audio management system 1 will be described. FIG. 8 is a flowchart illustrating operations carried out by the audio management system 1. In this description, the focus of attention will be on one of the multiple audio client systems 20.

First, when the management server 10 selects the audio client system 20, the controller 112 requests the audio client system 20 to provide the management server 10 with characteristic impedances of all the speakers 260 included in the audio client system 20 (step Sb10). The management server 10 may select the audio client system 20 in accordance with a schedule, or an administrator may select the audio client system 20 by use of an input device (e.g., a keyboard) or by use of an external terminal device (not illustrated) connected over the communication network Na.

Upon receipt of the request from the management server 10, the audio systems 200 included in the audio client system 20 carry out the following steps. Specifically, in each of the audio systems 200, the controller 2202 (the control apparatus 220) sends an instruction to read the characteristic impedance to the measuring instrument Ims (step Sb30). In response to this instruction, the measuring instrument Ims reads the characteristic impedance from the internal memory and returns it to the controller 2202.

Upon receipt of the characteristic impedance from the measuring instrument Ims, the controller 2202 sends the characteristic impedance to the communication controller 2204. The communication controller 2204 attaches an identifier that identifies the speaker 260 to the characteristic impedance, and causes the communication apparatus 226 to transmit the characteristic impedance with the identifier to the management server 10 (step Sb32). The characteristic impedance transmitted to the management server 10 at step Sb32 indicates a characteristic impedance of any of audio systems 200 included in the audio client system 20. The controller 2202 repeats Steps Sb30 and Sb32 for all the audio systems 200 of the audio system 20.

In the management server 10, the acquirer 114 acquires characteristic impedances from the audio client system 20 that the management server 10 has requested. The controller 112 determines whether the acquirer 114 has acquired characteristic impedances of all the speakers 260 included in the audio client system 20 (step Sb12). If characteristic impedances for all of the speakers are not acquired (that is, if the determination result in step Sb12 is "No"), the processing sequence returns to step Sb12. In other words, the controller 112 stands by until the acquirer 114 acquires the characteristic impedances for all of the speakers 260 included in the audio client system 20. In contrast, if the controller 112 determines that characteristic impedances have been acquired for all of the speakers (that is, if the determination result in step Sb12 is "Yes"), the controller 112 sends all of the acquired characteristic impedances to the determiner 116. The controller 112 reads out the standard characteristic impedance from the database Db_t, and send the standard characteristic impedance to the determiner 116 (step Sb13).

The focus of attention will now again be on a speaker 260 from among all the speakers 260 included in the audio client system 20. First, the determiner 116 compares the characteristic impedance of the speaker 260 to the standard characteristic impedance to calculate a value representative of divergence between the two characteristics. If the value is less than a threshold, the determiner 116 determines that the speaker 260 is normal. If the value is at the threshold or greater, the determiner 116 determines that the speaker 260 is abnormal. Then, the determiner 116 outputs the result of the determination to the controller 112 (step Sb14). The determiner 116 repeats step Sb14 for all of the speakers 260. Upon receipt of a determination result from the determiner 116, the controller 112 determines whether all of the speakers 260 are normal (step Sb16).

If all of the speakers 260 are normal (that is, if the determination result in step Sb16 is "Yes"), the controller 112 supplies the characteristic impedances of all the speakers determined to be normal to the statistical processor 118. The statistical processor 118 updates the standard characteristic impedance using the supplied characteristic impedances (step Sb18).

In contrast, if not all of the speakers 260 are normal (that is, if the determination result in step Sb16 is "No"), or in other words, if one or more of the speakers 260 is determined abnormal, the controller 112 notifies identifier(s) of speaker(s) determined abnormal, and thus an audio system 200 including a speaker 260 indicated by the identifier(s) (step Sb20). In step Sb20, if there is a speaker 260 that is determined to be normal, the controller 112 may supply, to the statistical processor 118, the characteristic impedance of the speaker 260 that is determined to be normal. Further, the statistical processor 118 may update the standard characteristic impedance using the supplied characteristic impedance.

Although in this embodiment, the controller 112 stands by until the characteristic impedance for all of the speakers 260 has been acquired, the controller 112 may compare a characteristic impedance with the standard characteristic impedance in order of acquisition.

In an audio system 200 of the audio client system 20, upon receipt of the identifier, the controller 2206 stops the output of the speaker 260 indicated by the identifier such that sound ceases to be output from the speaker 260 (step Sb34). It is of note that at step Sb20, the controller 112 of the management server 10 may notify the identifier(s) of all of the audio systems 200 included in the audio client system 20. In this case, the controller 2202 of each audio system 200 may determine whether the speaker indicated by the identifier is included in the audio system 200. If affirmative, the controller 2202 may execute step Sb34. Otherwise, the controller 2202 is not required to execute step Sb34.

Specifically, in the audio system 200 including the abnormal speaker 260, the controller 2202 controls the matrix selector to not select any of channels. Accordingly, an audio signal is not supplied to the abnormal speaker 260 and no sound is output from the speaker 260. However, if the matrix selector is set to supply only the audio signal to the abnormal speaker 260, no sound is output from any other speaker other than the abnormal speaker.

To avoid this situation, in the audio system 200 including the abnormal speaker 260, the controller 2202 instructs other audio systems 200, each of which includes a normal speaker, to supply, to the normal speaker instead of the abnormal speaker, the audio signal that would otherwise be output to the abnormal speakers (step Sb36). In other words, the controller 2202 instructs other audio systems 200 to provide sound that is not output from the abnormal speaker with sound provided by normal speakers.

Here, in normal use, an example case illustrated in FIG. 3 is assumed. In this example case, among the audio systems 200a to 200c, only the matrix selector M_b in the audio system 200b selects the channel In2, and only the speaker 260b receives a supply of the audio signal of the channel In2 If the speaker 260b is determined abnormal, the controller 2202 of the audio system 200b instructs use of the speaker 260 which is located closest to the speaker 260b, for example, the audio system 200a of the speaker 260a. Specifically, the controller 2202 instructs the matrix selector M_a in the audio system 200a to select the channel In2 in addition to the channel In1.

Figure 11:
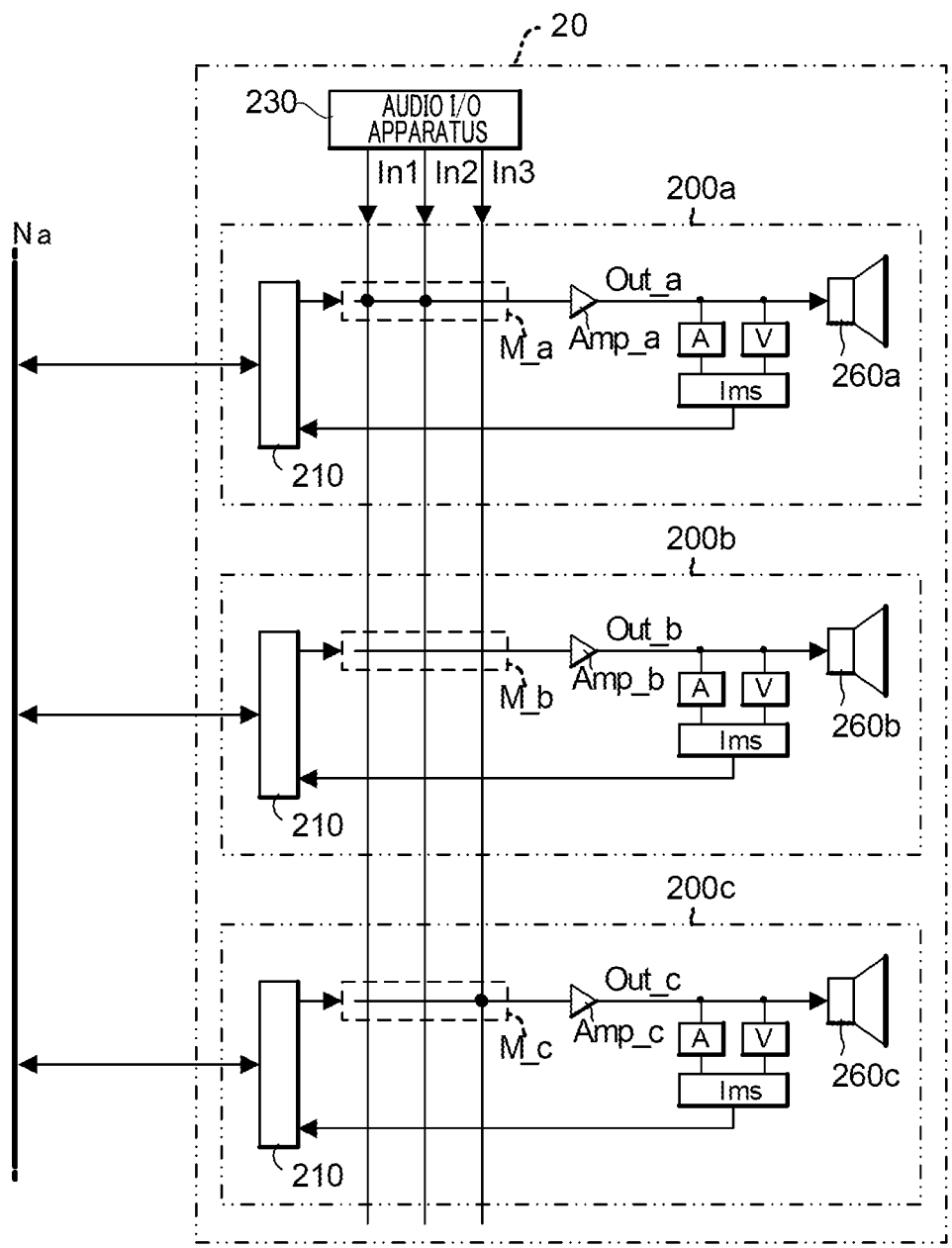
FIG. 11 is a diagram illustrating processing of a matrix selector in an audio client system.

According to this instruction, as illustrated in FIG. 11, although the matrix selector M_a of the audio system 200b selects none of the channels In1, In2, and In3, the matrix selector M_b of the audio system 200a selects the channels In1 and In2 That is, the controller 2202 of the audio system 200b including an abnormal speaker 260b sets a signal path from the audio I/O apparatus 230 to the normal speaker 260a such that an audio signal for the abnormal speaker 260b is supplied to the normal speaker 260a. Accordingly, the audio signal for the speaker 260b is supplied to the speaker 260a instead of to the speaker 260b, thereby avoiding a situation that the audio signal is not converted into sound by the speaker 260b.

Setting of which speaker is used instead of an abnormal speaker is defined in accordance with factors such as speaker layout and installation state. For this reason, this setting is defined for each audio client system 20. For example, in the example shown in FIG. 3, which is described above, if the speaker 260b is arranged closest to the speaker 260c rather than the speaker 260a, the matrix selector M_c of the audio system 200c may select the channel In2 in addition to the channel In3.

After completion of step Sb18 or Sb36, the series of steps end. In this embodiment, although management of an audio client system 20 is described, the management may be applied to the audio client systems 20-1 to 20-n concurrently.

Although not particularly described in the flowchart, in one embodiment, the determiner 116 may also notify the administrator of the determination result obtained by step Sb14, or may prompt the administrator to repair or replace an abnormal speaker. In one embodiment, when the controller 112 identifies an abnormal speaker, the controller 112 may register a characteristic impedance of the abnormal speaker in the database Db_d together with an identifier of the abnormal speaker.

According to this embodiment, the conditions of speakers 260 are determined without need for the administrator to actually listen to the sounds output from the speakers 260. Accordingly, the administrator is not required to physically move to the place where the speakers 260 are placed to determine whether the speakers 260 are working properly. In this embodiment, since the characteristic impedances of the speakers 260 are measured on the basis of audio signals used in the normal mode, it is not necessary to use a test signal for the measurement of the characteristic impedances. While the user is ordinarily using the audio client systems, the latest characteristic impedances are obtained, and each is compared with the standard characteristic impedance. Accordingly, the audio management system is able to determine the latest conditions of the speakers 260.

In this embodiment, a characteristic impedance of a speaker 260 is compared to the standard characteristic impedance, which refers to the average of characteristic impedances obtained from normal speakers. If the characteristic impedance does not satisfy the standard characteristic impedance, the management server determines that the speaker 260 to be checked is abnormal. Consequently, in this embodiment, deterioration over time is taken into account to determine whether each of the speakers 260 is working properly.

Figure 12:
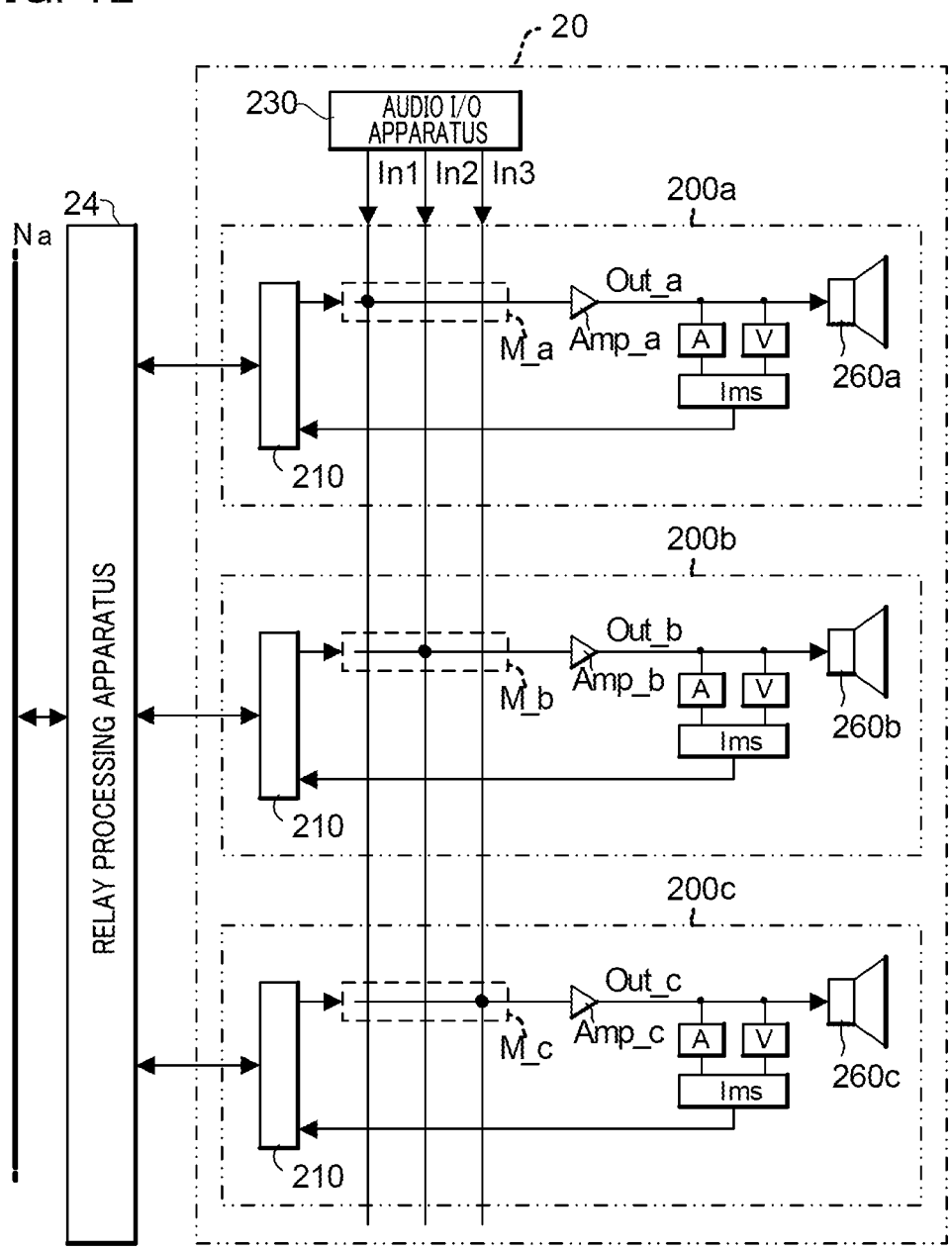
FIG. 12 is a diagram illustrating a hardware configuration of an audio client system according to another aspect.

In this embodiment, the communication controller 2204 is generated in the control apparatus 220 of the processing apparatus 210, but the technique is not limited thereto. For example, as illustrated in FIG. 12, the audio management system 1 may include a relay processing apparatus 24. In this case, the relay processing apparatus 24 may be provided between the audio client system 20 and the communication network Na, and may connect to the management server 10 and the audio client system 20. The communication controller 2116 may be generated in the relay processing apparatus 24. The relay processing apparatus 24 is an information processing terminal, such as a personal computer. The relay processing apparatus 24 acts to relay information to the management server 10 or to the audio client system 20. The relay processing apparatus 24 transmits characteristic impedances of the speakers to the management server 10, instead of the audio client system 20.

Figure 13:
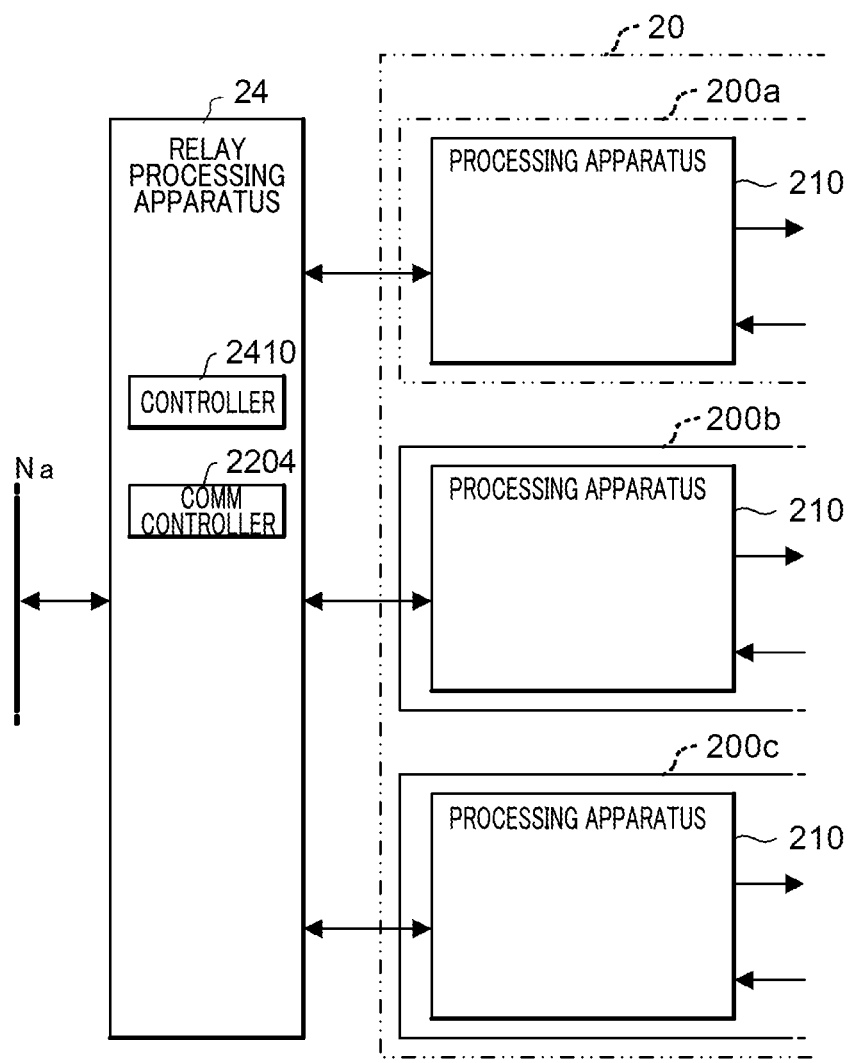
FIG. 13 is a functional block diagram of an audio client system according to another aspect.

Description will now be given below with reference to functional blocks illustrated in FIG. 13. Although not shown, the relay processing apparatus 24 includes a controller and a storage. By causing the controller to execute a program stored in the storage, a communication controller 2204a and a controller 2410 that controls the communication controller 2204 are generated, as illustrated in FIG. 13. In the audio system 200a, the processing apparatus 210 transmits, to the relay processing apparatus 24, a characteristic impedance from the measuring instrument Ims.

The same applies to the audio systems 200b and 200c. Characteristic impedances obtained by each of the audio systems 200b and 200c are transmitted to the relay processing apparatus 24. For this reason, transmission of characteristic impedances by the audio systems 200a to 200c may occur at the same time. Even if such a case occurs, the communication controller 2204 provided in the relay processing apparatus 24 transmits characteristic impedances from the audio systems 200a, 200b, and 200c to the management server 10, according to factors such as a level of importance and a communication state of the communication network Na. Since the communication controller 2204 is generated in the relay processing apparatus 24, traffic in the communication network Na can be reduced.

In this embodiment, the database Db_d includes characteristic impedances of one or more speakers determined abnormal. Accordingly, the characteristic impedance of a speaker 260 to be checked may be compared to not only the standard characteristic impedance, but also each of the characteristic impedances registered in the database Db_d. Specifically, if (i) the characteristic impedance of the speaker 260 to be checked does not diverge from the standard characteristic impedance, and (ii) the characteristic impedance is similar to any of the characteristic impedances registered in the database Db_d, the characteristic impedance of the speaker 260 may be determined abnormal. Characteristic impedances registered in the database Db_d may be associated with the cause of an abnormality (e.g., increased temperature in a speaker). In this configuration, if a characteristic impedance of a speaker 260 to be checked is similar to any of characteristic impedances registered in the database Db_d, the determiner 116 may notify the administrator of the cause of the abnormality associated with the characteristic. The administrator is thus able to determine the cause of the abnormality.

There are some cases where factors pertaining to the audio client systems 20-1 to 20-n, such as the installation locations, the usage environments, and the usage start periods, substantially differ from each other. If so, a degree of deterioration over time in the speakers 260 of each of the audio client systems 20 will be predicted to be different. Accordingly, the first audio client system 20-1 may register, in the database Db_1, first standard characteristic impedance corresponding to the first audio client system 20-1, separately from the standard characteristic impedance registered in the database Db_t.

Here, the first standard characteristic impedance refers to a standard obtained by averaging characteristic impedances, which are obtained from only speakers determined abnormal from among all the speakers included in the first audio client system 20-1.

The first audio client system 20-1 may repeat the following determination for all of the speakers 260. Specifically, the first audio client system 20-1 may compare a characteristic impedance of a speaker 260 to the standard characteristic impedance to obtain divergence between the two impedances. Further the first audio client system 20-1 may compare the characteristic impedance to the first standard characteristic impedance to obtain divergence between the two impedances. Then the first audio client system 20-1 may apportion an appropriate weight to each of the obtained divergences, and compare a weighted value to a threshold. Depending on an obtained result, the first audio client system 20-1 may determine whether the speaker 260 is abnormal.

The same applies to the other audio client systems 20-2 to 20-n. For example, the second audio client system 20-2 may register, in the database Db_2, a second standard characteristic impedance corresponding to the second audio client system 20-2. The second audio client system 20-2 may then repeat, for all the speakers 260 included therein, the same steps as carried out by the first audio client system 20-1.

In this embodiment, averaging is given as an example of the statistical processing carried out by the statistical processor 118. In this embodiment, it is conceivable that a noticeable change in a characteristic impedance may not occur unless a certain length of time elapses from the start of usage of the audio management system. Accordingly, until a given time has elapsed from the day on which the audio client systems 20 are placed, even if a characteristic impedance of a speaker 260 to be checked is determined to be normal, the statistical processor 118 may exclude the characteristic impedance from the averaging. That is, in this case, the statistical processor 118 does not add the characteristic impedance to the characteristic impedances registered in the database Db_t.

Further, examples of the statistical processing may include the following. For example, the statistical processor 118 may perform the statistical processing using a weighting coefficient based on a time that has elapsed since a characteristic impedance was last obtained. Specifically, the statistical processor 118 may set a low weighting coefficient for a relatively old characteristic impedance, and may set a high weighting coefficient for a relatively new characteristic impedance.

APPENDIXES

From the foregoing embodiment and the like, the following aspects will be clear.

A management server according to an aspect of the present disclosure (first aspect) is a management server including: a memory; and at least one processor configured to implement instructions stored in the memory, in which: the at least one processor is configured to: control, by use of a first database, a first audio client system that includes a first speaker and a second speaker, the first database including a first standard characteristic impedance, which is obtained by application of statistical processing to a first characteristic impedance of the first speaker and a second characteristic impedance of the second speaker, acquire a new characteristic impedance of the first speaker, compare the new first characteristic impedance with the first standard characteristic impedance, to determine a condition of the first speaker, based on a result of the comparison, and update, based on the condition of the first speaker, the first standard characteristic impedance of the first database, using the new first characteristic impedance.

According to this aspect, the new first characteristic impedances of the first speakers is compared to the first standard characteristic impedance. The first standard characteristic impedance refers to the standard that is obtained by application of statistical processing to the first characteristic impedance of the first speaker and the second characteristic impedance of the second speaker. Then a condition of the first speaker is determined based on the result. That is, the current state of the first speaker is not compared to the past condition of the first speaker only. Rather, the current condition of the first speaker is compared to the standard characteristic impedance that reflects the condition of the second speaker. Since the condition of the second speaker is taken into account to determine the condition of the first speaker, an abnormality caused by deterioration over time can be detected. Further, an administrator is not required to physically move to a place where the first speaker is located and is not required to listen to an actual sound output from the first speaker.

In an example of the first aspect (second aspect), the at least one processor is configured to: control a second audio client system that includes a third speaker, acquire the new first characteristic impedance of the first speaker in the first audio client system, and acquire a new third characteristic impedance of the third speaker in the second audio client system, determine the new first characteristic impedance of the first speaker in the first audio client system, and compare the new third characteristic impedance of the third speaker in the second audio client system with the first standard characteristic impedance, to determine a condition of the third speaker, based on a result of the comparison.

According to this aspect, a condition of the first speaker in the first audio client system and a condition of the third speaker in the second audio client system are determined using a common standard characteristic impedance.

In an example of the second aspect (third aspect), the at least one processor is configured to: determine whether the condition of the first speaker is abnormal, and determine whether the condition of the third speaker is abnormal.

In an example of the third aspect (fourth aspect), if the first speaker of the first audio client system is determined to be normal, and the third speaker of the second audio client system is determined to be normal, the at least one processor is configured to update the first standard characteristic impedance of the first database, using the new first characteristic impedance of the first speaker and the new third characteristic impedance of the third speaker.

According to this aspect, the standard characteristic impedance is updated on the basis of a plurality of audio client systems. Accordingly, the accuracy of the statistical processing can be increased as compared to a case in which the standard characteristic impedance is updated on the basis of a single audio client system.

In an example of the third or fourth mode (fifth mode), the at least one processor is configured to: control, by use of the first database, the first audio client system, control, by use of a second database, a second audio client system including a third speaker and a fourth speaker, the second database including a second standard characteristic impedance, which is obtained by application of statistical processing to a third characteristic impedance of the third speaker and a fourth characteristic impedance of the fourth speaker, compare the new first characteristic impedance with the first standard characteristic impedance, to determine whether the first speaker is abnormal, based on the result of the comparison, and compare the new third characteristic impedance with the third standard characteristic impedance, to determine whether the third speaker is abnormal, based on the result of the comparison.

According to this aspect, separate standard characteristic impedances are used for the two audio client systems. Accordingly, accuracy in determination of the speakers can be increased as compared to a case where a common standard characteristic impedance is used between the two audio client systems.

An audio management method according to an aspect of the present disclosure (sixth aspect) is an audio management method implemented by a processor, including: preparing a first audio client system that includes a first speaker and a second speaker; preparing a first database that includes a first standard characteristic impedance, which is obtained by application of statistical processing to a first characteristic impedance of the first speaker and a second characteristic impedance of the second speaker; acquiring a new characteristic impedance of the first speaker; comparing the new first characteristic impedance with the first standard characteristic impedance; determining a condition of the first speaker, based on a result of the comparison; and updating, based on the condition of the first speaker, the first standard characteristic impedance of the first database, using the new first characteristic impedance.

An audio client according to an aspect of the present disclosure (seventh mode) is an audio client system including: a first speaker; a second speaker; a communication apparatus configured to communicate with a management server that uses a first database, the first database including a first standard characteristic impedance, which is obtained by application of statistical processing to a first characteristic impedance of the first speaker and a second characteristic impedance of the second speaker, a measuring instrument configured to measure a new first characteristic impedance of the first speaker; a memory; and at least one processor configured to implement instructions stored in the memory, in which: the at least one processor is configured to cause the communication apparatus to transmit the new first characteristic impedance to the management server, and a condition of the first speaker is determined by the management server, based on the new first characteristic impedance and the first standard characteristic impedance.

According to this aspect, the current condition of the first speaker is compared to the standard characteristic impedance that reflects the condition of the second speaker. Since the condition of the second speaker is taken into account to determine the condition of the first speaker, abnormality caused by deterioration over time can be detected. Further, the condition of the first speaker is determined by the management server. Accordingly, the administrator is not required to physically move to the places where the first speaker is located, and is not required to listen to actual sound output from the first speaker.

In an audio client according to an aspect of the present disclosure (eight aspect), the measuring instrument is configured to measure a new second characteristic impedance of the second speaker in addition to the new first characteristic impedance, and the at least one processor is configured to cause the communication apparatus to transmit, to the management server, the new second characteristic impedance in addition to the new first characteristic impedance.

According to this aspect, the conditions of the first speaker and the second speaker of the first audio client system is determined by the management server.

In an example of the eighth aspect (ninth aspect), the audio client system further includes: an input apparatus (e.g., an audio I/O apparatus 230) configured to receive a first signal for the first speaker or a second signal for the second speaker, in which: if the first speaker is determined abnormal by the management server and the second speaker is determined normal by the management server, the at least one processor is configured to set a signal path from the input apparatus to the second speaker such that the first signal is supplied to the second speaker instead of the first speaker, and if the first speaker is determined normal by the management server and the second speaker is determined abnormal by the management server, the at least one processor is configured to set a signal path from the input apparatus to the second speaker such that the second signal is supplied to the first speaker instead of the second speaker.

According to this aspect, sound output from a speaker determined abnormal is compensated for by a speaker determined to be normal.

An audio management system according to an aspect of the present disclosure (tenth mode) is a management server; a first audio client system that includes a first speaker and a second speaker; and a first database that includes a first standard characteristic impedance, which is obtained by application of statistical processing to a first characteristic impedance of the first speaker and a second characteristic impedance of the second speaker, in which: the first audio client system further includes: a communication apparatus configured to communicate with the management server; a measuring instrument configured to measure a new first characteristic impedance of the first speaker; a first memory; and at least one first processor configured to implement instructions stored in the first memory, in which the at least one first processor is configured to cause the communication apparatus to transmit the new first characteristic impedance to the management server, the management server includes: a second memory; and at least one second processor configured to implement instructions stored in the second memory, the at least one second processor is configured to: acquire, from the first audio client system, the new characteristic impedance of the first speaker, compare the new first characteristic impedance with the first standard characteristic impedance, to determine a condition of the first speaker, based on a result of the comparison, and update, based on the condition of the first speaker, the first standard characteristic impedance of the first database, using the new first characteristic impedance.

In an example of the tenth aspect (eleventh aspect), the audio management system further including a relay processing apparatus configured to connect the first audio client system and the management server, in which, the relay processing apparatus transmits the new first characteristic impedance to the management server, instead of to the first audio client system.

According to this aspect, a load on the management server can be reduced.

DESCRIPTION OF REFERENCE SIGNS

1: audio management system
10: management server
20: audio client system
114: acquirer
116: determiner
118: statistical processor
210: processing apparatus
2202: communication controller

What is claimed is:
1. A management server comprising:
a memory; and
at least one processor configured to implement instructions stored in the memory, wherein the at least one processor is configured to:
control, by use of a first database, a first audio client system that includes a first speaker and a second speaker,
the first database including a first standard characteristic impedance, which is obtained by application of statistical processing to a first characteristic impedance of the first speaker and a second characteristic impedance of the second speaker,
acquire a new characteristic impedance of the first speaker,
compare the new first characteristic impedance with the first standard characteristic impedance, to determine a condition of the first speaker, based on a result of the comparison, and
update, based on the condition of the first speaker, the first standard characteristic impedance of the first database, using the new first characteristic impedance.
2. The management server according to claim 1, wherein the at least one processor is configured to:
control a second audio client system that includes a third speaker,
acquire the new first characteristic impedance of the first speaker in the first audio client system, acquire a new third characteristic impedance of the third speaker in the second audio client system, determine the new first characteristic impedance of the first speaker in the first audio client system, and compare the new third characteristic impedance of the third speaker in the second audio client system with the first standard characteristic impedance, to determine a condition of the third speaker, based on a result of the comparison.

3. The management server according to claim 2, wherein the at least one processor is configured to:

determine whether the condition of the first speaker is abnormal, and determine whether the condition of the third speaker is abnormal.

4. The management server according to claim 3, wherein if the first speaker of the first audio client system is determined normal, and the third speaker of the second audio client system is determined normal:

the at least one processor is configured to update the first standard characteristic impedance of the first database, using the new first characteristic impedance of the first speaker and the new third characteristic impedance of the third speaker.

5. The management server according to claim 1, wherein the at least one processor is configured to:

control, by use of the first database, the first audio client system, control, by use of a second database, a second audio client system including a third speaker and a fourth speaker, the second database including a second standard characteristic impedance, which is obtained by application of statistical processing to a third characteristic impedance of the third speaker and a fourth characteristic impedance of the fourth speaker, compare the new first characteristic impedance with the first standard characteristic impedance, to determine whether the first speaker is abnormal, based on the result of the comparison, and compare the new third characteristic impedance with the third standard characteristic impedance, to determine whether the third speaker is abnormal, based on the result of the comparison.

6. An audio management method implemented by a processor, comprising:

preparing a first audio client system that includes a first speaker and a second speaker;

preparing a first database that includes a first standard characteristic impedance, which is obtained by application of statistical processing to a first characteristic impedance of the first speaker and a second characteristic impedance of the second speaker;

acquiring a new characteristic impedance of the first speaker;

comparing the new first characteristic impedance with the first standard characteristic impedance;

determining a condition of the first speaker, based on a result of the comparison; and updating, based on the condition of the first speaker, the first standard characteristic impedance of the first database, using the new first characteristic impedance.

7. An audio client system comprising:

a first speaker;

a second speaker;

a communication apparatus configured to communicate with a management server that uses a first database;

the first database including a first standard characteristic impedance, which is obtained by application of statistical processing to a first characteristic impedance of the first speaker and a second characteristic impedance of the second speaker, a measuring instrument configured to measure a new first characteristic impedance of the first speaker;

a memory; and at least one processor configured to implement instructions stored in the memory, wherein the at least one processor is configured to cause the communication apparatus to transmit the new first characteristic impedance to the management server, and a condition of the first speaker is determined by the management server, based on the new first characteristic impedance and the first standard characteristic impedance.

8. The audio client system according to claim 7, wherein the measuring instrument is configured to measure a new second characteristic impedance of the second speaker in addition to the new first characteristic impedance, and the at least one processor is configured to cause the communication apparatus to transmit, to the management server, the new second characteristic impedance in addition to the new first characteristic impedance.

9. The audio client system according to claim 8, further comprising: an input apparatus configured to receive a first signal for the first speaker or a second signal for the second speaker, wherein if the first speaker is determined abnormal by the management server and the second speaker is determined normal by the management server:

the at least one processor is configured to set a signal path from the input apparatus to the second speaker such that the first signal is supplied to the second speaker instead of the first speaker, and if the first speaker is determined normal by the management server and the second speaker is determined abnormal by the management server:

the at least one processor is configured to set a signal path from the input apparatus to the first speaker such that the second signal is supplied to the first speaker instead of the second speaker.

10. An audio management system comprising:

a management server;

a first audio client system that includes a first speaker and a second speaker; and a first database that includes a first standard characteristic impedance, which is obtained by application of statistical processing to a first characteristic impedance of the first speaker and a second characteristic impedance of the second speaker, wherein the first audio client system further includes:

a communication apparatus configured to communicate with the management server;

a measuring instrument configured to measure a new first characteristic impedance of the first speaker;

a first memory; and at least one first processor configured to implement instructions stored in the first memory, wherein the at least one first processor is configured to cause the communication apparatus to transmit the new first characteristic impedance to the management server, the management server includes:
  a second memory; and
  at least one second processor configured to implement instructions stored in the second memory, the at least one second processor is configured to:
  acquire, from the first audio client system, the new characteristic impedance of the first speaker,
  compare the new first characteristic impedance with the first standard characteristic impedance, to determine a condition of the first speaker, based on a result of the comparison, and
  update, based on the condition of the first speaker, the first standard characteristic impedance of the first database, using the new first characteristic impedance.

11. An audio management system according to claim 10, further comprising: a relay processing apparatus configured to connect the first audio client system and the management server, wherein
  the relay processing apparatus transmits the new first characteristic impedance to the management server, instead of to the first audio client system.

* * * * *